Feb. 25, 1964  H. H. GLÄTTLI  3,122,313
FLUID LOGICAL DEVICE
Filed May 11, 1961  2 Sheets-Sheet 1

INVENTOR
HANS H. GLÄTTLI
BY Robert E. Sandt
AGENT

Feb. 25, 1964   H. H. GLÄTTLI   3,122,313
FLUID LOGICAL DEVICE
Filed May 11, 1961   2 Sheets-Sheet 2
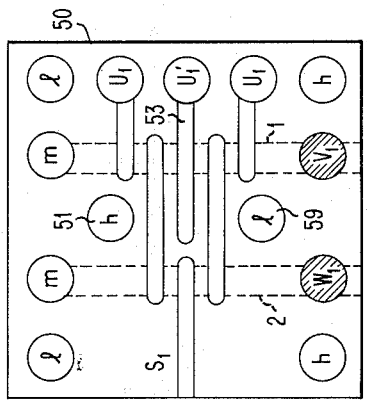
FIG. 7
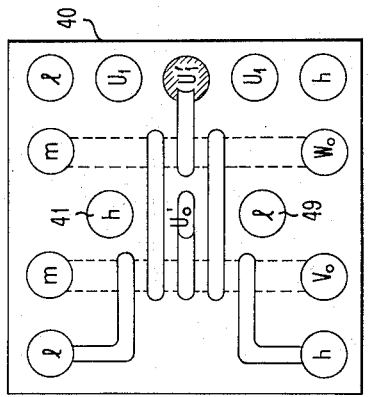
FIG. 6
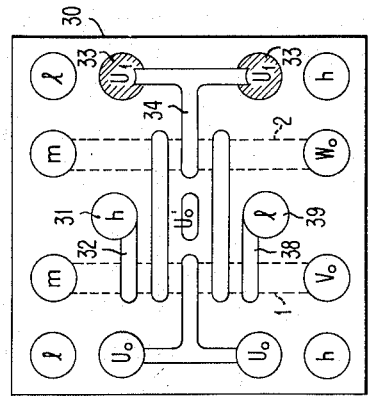
FIG. 5
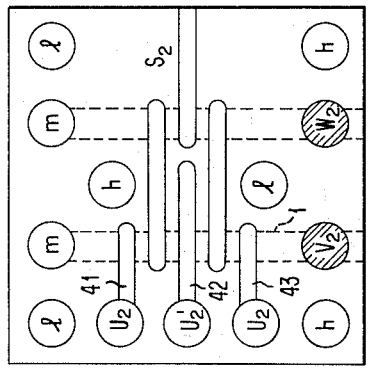
FIG. 10
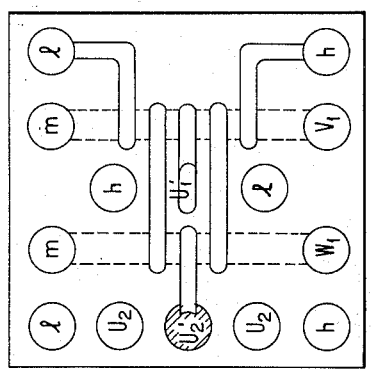
FIG. 9
FIG. 8

United States Patent Office 3,122,313
Patented Feb. 25, 1964

3,122,313
FLUID LOGICAL DEVICE
Hans H. Glättli, Kusnacht, Zurich, Switzerland, assignor to International Business Machines Corporation, New York, N.Y., a corporation of New York
Filed May 11, 1961, Ser. No. 109,370
Claims priority, application Switzerland May 12, 1960
5 Claims. (Cl. 235—61)

This invention relates to fluid operated logical devices and more particularly to a versatile fluid operated logical device capable of performing a great variety of logical operations.

Small typewriter size calculators which operate on a purely mechanical principle have been known for a long time. Furthermore, hydraulic operated machine parts are also employed in the field of computing machines. The use thereof is, however, restricted substantially to mechanical operations, like speeding up printers or punchers or effect a faster access to tape units. It is also known to employ a hydraulic device to perform selected operations so far performed by electrical means.

The element according to the present invention comprises a first and a second valve means, there being connected to said first valve means a first, a second and a third input line and between said first and second valve means a first and a second connecting line, said lines being connected to said first valve means in relation to two different states thereof in such a manner that there is provided a fluid connection to said first connecting line selectively from said first or second input line and to said second connecting line selectively from said second or third input line, an output line, said output line and said first and second connecting line being connected to said second valve means in relation to two different states thereof in such a manner that there is provided a fluid connection to said output line selectively from said first or second connecting line, and a control input means being provided to apply predetermined fluid indications to said first and second valve means to selectively condition them into said two different states.

It is therefore, an object of this invention to provide a fluid operated logical device capable of performing a variety of logical operations by mere adjustment of the pressure statuses in control ducts of the device.

It is a further object to provide a fluid operated logical device capable of operating as a binary adder as well as an amplifier, inverter, "and" device, "or" device, and exclusive "or" device.

Yet another object of the invention is to provide a fluid operated logical device capable of the foregoing functions in a structure which is economical to fabricate, and by virtue of its configuration is adapted to be assembled with similar such units in packaged assembly with mating registration of fluid ducts.

The foregoing and other objects, features and advantages of the invention will be apparent from the following more particular description of preferred embodiments of the invention, as illustrated in the accompanying drawings.

In the drawings:

FIGS. 5–10 are sketches of structures for performing the operations "sum," "carry" and "no-carry," which structures are in a shape suited to be assembled into packages.

Figure 1:
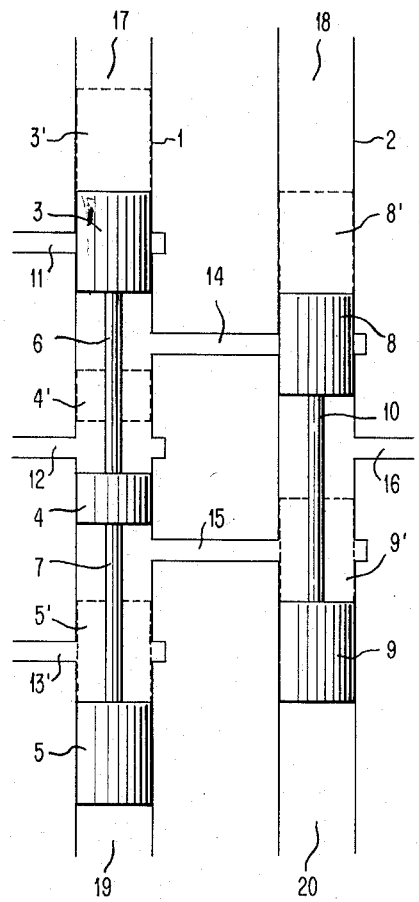
FIG. 1 shows a preferred embodiment of an element according to the invention.

Referring to FIG. 1, there is shown a first and a second valve means comprising a cylinder 1 and a cylinder 2, respectively. Located within the cylinder 1 is a three-sectional piston means comprising the pistons 3, 4 and 5, which are rigidly connected by rods 6 and 7. Inside the cylinder 2 there is arranged a two-sectional piston means comprising the pistons 8 and 9, which are rigidly linked together by rod 10. Furthermore, there are provided input lines 11, 12 and 13 for the application of fluid of predetermined pressure. Connecting cylinder 1 and cylinder 2 are the connecting lines 14 and 15. An output line is designated by reference numeral 16. The piston means of the first cylinder is arranged to be movable between two end positions, one end position being defined to be the position in which the pistons 3, 4 and 5 are shown, the other end position being defined to be the position in which the pistons are at the locations 3', 4' and 5', which is indicated by dashed lines. The piston means inside the cylinder 2 is also characterized by two end positions, one being the position in which the pistons 8 and 9 are shown, the other being the position in which the pistons are at the locations 8' and 9', indicated by dashed lines.

In the lower end position, piston 3 closes input line 11, piston 4 is located between input lines 12 and 13 and piston 5 is located below the input line 13. Connecting line 14 is located between pistons 3 and 4 and is in connection with input line 12. Connecting line 15 is located between pistons 4 and 5 and is connected with input line 13. The piston means in cylinder 2 in its lower end position closes connecting line 14 and leaves a connection between connecting line 15 and output line 16. In the upper end position of the piston means in cylinder 1, the input line 11 is connected with the connecting line 14 and the input line 13 is closed by the piston 5. Piston 4 is located between input lines 11 and 12, and input line 12 is connected with connecting line 15. If the piston means of cylinder 2 is in its upper end position, the connecting line 14 is in connection with output line 16 and the connecting line 15 is closed by cylinder 9.

Fluid of predetermined pressure can be applied at the ends 17, 19 and 18, 20 of the cylinders 1 and 2, respectively.

Figure 2:
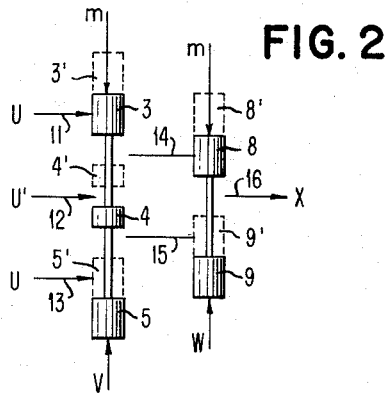
FIG. 2 shows, in a simplified representation, the element arranged to produce a "sum" information.
Figure 3:
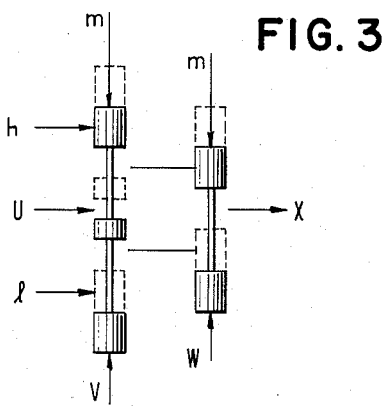
FIG. 3 shows, in a simplified representation, the element arranged to produce a "carry" information.
Figure 4:
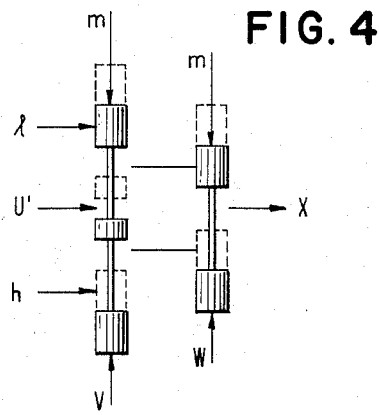
FIG. 4 shows, in a simplified representation, the element arranged to produce a "no-carry" information.

In FIGS. 2, 3 and 4 the same element as just described in connection with FIG. 1 is again illustrated in a simplified manner. The cylinders 1 and 2 are not shown, and the input, connecting, and output lines, or pipes, are indicated by lines only. For the sake of clarity, reference numerals employed in FIG. 1 are also provided in FIG. 2, the same numerals denoting the same parts.

In order to explain how the "sum" operation is performed, reference is made, in addition to FIG. 1, to FIG. 2, in particular. Let it be assumed that two binary numbers V and W have to be added, whereby a binary "carry" value U also has to be considered. The binary signal U' connotes an inverted "carry" signal or "no-carry" signal. If any of these values U, V and W are a binary "0," this is represented by low pressure. If any of these values are a binary "1," this is represented by high pressure. In order to form the "sum" the following connections are made:

Input lines 11, 12, 13 have applied thereto, as shown in FIG. 2, the signals U, U' and U, respectively. Cylinder inputs 17, 18 of FIG. 1 have applied thereto a fluid of medium pressure $m$, that is of a pressure which is between the value of the above mentioned low and high pressure. Cylinder inputs 19 and 20 have applied thereto the signals V and W, respectively. The foregoing is illustrated in FIG. 2.

In further explanation of FIG. 2 let it be assumed that the values U, V and W all represent a binary "0," that is, at the respective inputs there is applied low pressure. This means that U' is the only high pressure signal applied. Under these conditions, due to the applied medium pressure $m$, the first and second piston means both stay in the lower end position and the input 13 is connected via connecting line 15 with the output 16, which output therefore signals a "sum" signal "0." Let us now assume that W represents a "1" and V and U still indicate "0" values. This means that the piston means 8, 9 is pushed into its upper end position. Under these conditions the connecting line 15 is closed by piston 9 and the output line 16 is connected via connecting line 14 with the input 12 so that a "1" is indicated as the "sum" signal X.

Let it now be assumed that V and W both indicate a binary "1." It is easily seen, that under this assumption the first and the second piston means both will be in their upper end position. This causes the output 16 to be connected through connecting line 14 with input line 11 so that, considering the fact that a "carry" "0" was assumed, a "0" will appear in the output, in other words the signal at the output 16 will be $X=0$.

Assuming now that in addition to V and W representing a binary "1," there is also a "carry" indicated, that is, U feeds in high pressure and U' feeds in low pressure. It is easily seen that under these conditions a "1" is signalled at the output 16.

For the sake of completeness it may finally be assumed that a "1" is indicated by the "carry" and "0's" by the inputs for V and W. In this case both piston means are, due to the medium pressure $m$, applied at the control inputs 17 and 18, in their lower end position. High pressure from input line 13 through connecting line 15 is applied to the output line 16, so that a "sum" signal "1" is indicated as output signal X.

If, in addition, V also represents a binary "1," the output 16 is connected through connecting line 15 with input line 12 having applied thereto the signal $U'=0$, so that X will be "0." Finally, in the case $V=$"0," $W=$"1" and $U=$"1" the signal U' is conveyed through line 14 to the output so that again a "0" will appear as the signal X.

Referring now to FIG. 3, which shows the embodiment to produce the "carry" signal, which appears as the output signal X, the connections are as follows: Control input 17 and 18 of FIG. 1 again have supplied thereto a medium pressure fluid $m$ and to the control inputs 19 and 20 again are applied the binary numbers V and W, respectively. Inputs 11, 12 and 13 have applied thereto high pressure $h$, the "carry" signal U from a previous stage and low pressure $l$, respectively. These high and low pressures are supplied by connecting to a high and low pressure source, respectively. A "no-carry" signal is not required. A detailed discussion as to the operation under the assumption of all the possibilities of binary "0" and binary "1" values is omitted as this is believed no more to be necessary in view of the foregoing explanation in connection with FIG. 2.

In FIG. 4 there is shown the embodiment to produce the "no-carry" signal in the case that two binary numbers V and W and a binary "carry" U are given. As shown in the figure, medium pressure $m$ is again applied to control inputs 17 and 18 of FIG. 1 and the binary numbers V and W are again applied to the control inputs 19 and 20, respectively. To the input lines 11, 12 and 13 there are applied low pressure $l$, the "no-carry" signal U' from the previous stage and high pressure $h$, respectively. A "carry" signal of the previous stage is not required. Again in this example of FIG. 4, a detailed discussion of the operation under the combinations of various possible binary inputs is not given, it being believed that the operation can most easily be derived from examination of FIG. 4 together with the foregoing explanations.

FIGS. 5–10 show top views of embodiments designed as building blocks in the shape of flat, quadrangular prisms. The large sides of the prisms are parallel to the plane of the drawing. Each block is built such that it can be placed with its top and bottom surface into contact with adjacent ones, whereby the corresponding openings for the fluid passage from one element to the next are in registry with each other. FIG. 5 shows the first prism 30 of such a package. FIG. 6 shows the prism 40 placed upon the first prism 30, FIG. 7 the prism 50 placed upon the prism 40 of FIG. 6, and so on. The element 30 of FIG. 5 serves to form a "carry" $U_1$, the element 40 of FIG. 6 a "no-carry" $U_1'$ and the element 50 of FIG. 7 to form the "sum" $S_1$. The element of FIG. 8 again forms a "carry" $U_2$, the element of FIG. 9 forms a "no-carry" $U_2'$ and finally the element of FIG. 10 forms a "sum" $S_2$.

For the detailed explanation of the FIGS. 5–10 let it be assumed that there are to be added the two binary numbers N and M:

$$N=V_2V_1V_0$$
$$M=W_2W_1W_0$$

comprising the digits $V_0$, $V_1$, $V_2$ and $W_0$, $W_1$, $W_2$, respectively.

Thereby it is assumed that from the addition of $V_0+W_0+U_0$ ($U_0$ being the carry from the previous stage) the sum $S_0$ is already formed. FIG. 5 shows the forming of the "carry" $U_1$ when the values $V_0$, $W_0$ and $U_0$ are applied. FIG. 6 shows the forming of the "no-carry" $U_1'$ from these values and FIG. 7 shows the forming of the sum $S_1$, with the "carry" $U_1$, its inversion or corresponding "no-carry" $U_1'$ and the digits $V_1$ and $W_1$ as given values.

Referring now in particular to FIG. 5, there is shown an arrangement for producing a "carry." The arrangement corresponds to the arrangement of FIG. 3. However, it is built in a somewhat different manner. In FIG. 5, the two cylinders 1 and 2, which are not shown in FIG. 3, are represented by the dashed lines. The piston means are not shown in FIG. 5 in order not to overload the figure. A high pressure source applies a high pressure fluid to the conductors designated $h$, a low pressure source applies low pressure fluid to the conductors designated $l$. The conductor lines $h$ and $l$ are formed by holes arranged perpendicularly to the plane of the drawing or to the large surfaces of the quadrangular prism. According to the function to be performed by the element, in this case the forming of the "carry," horizontal channels, like for instance channels 32 and 34, are provided, which lead to the first or second cylinder 1 and 2, respectively. As can be seen in FIG. 3, high pressure $h$ has to be connected to the first cylinder. This is accomplished in FIG. 5 by connecting the high pressure from the vertical conductor 31 through the horizontal pipe 32 to cylinder 1. Low pressure fluid is connected from the vertical bore 39 via input line 38 to the cylinder 1. The carry signal designated with U in FIG. 3 is applied in FIG. 5 from two locations designated $U_0$. In the same manner as shown in FIG. 3 fluid of a medium pressure is provided at the control locations $m$. The information representing the binary numbers $V_0$ and $W_0$ is fed at the control locations designated by these reference symbols. As can be seen by inspection of the FIGS. 5–10, the vertical bores 31 and 39 for instance, go through all the prisms stacked upon each other. In the following FIGS. 6 and 7 they are designated 41, 49 and 51, 59, respectively. However, for instance, the holes 33 for the infomation $U_1$ have been shaded to indicate that these holes are not made to go from the top surface of the prism all the way through the prism. They penetrate into the block 30 to the depth of the cylinder 1 to establish through the connecting line 34 a fluid connection therewith. Generally, vertical channels, like channels 33, which are shaded, do not extend all the way through a layer but penetrate only to the depth of the channel, to which they are connected, whereas vertical channels shown in blank, go completely through the layer in order to communicate with a corresponding opening of the layer located adjacently.

A comparison of FIGS. 3 and 5 reveals clearly that the arrangement of FIG. 5 with regard to connections and operation is identical with the arrangement of FIG. 3, so that a "carry" operation is performed by the structure shown in FIG. 5. The "carry" signal $U_1$ as produced in the arrangement of FIG. 5 appears in the conductor 34 where it is divided into two channels each designated 33. The bores 33 are illustrated in a shaded manner, indicating, as mentioned above, that the carry signal appearing in conductor 34 is fed into two vertical bores which do not communicate through the bottom surface of the element of FIG. 5, but which extend only in the upward direction through the element to form an opening in the upper surface of the prism.

In an analogous way FIG. 6 shows a prismatic element 40 for producing the "no-carry" operation. A comparison with FIG. 4 reveals that the two arrangements are identical with regard to their connections and operation. Low pressure is applied at the bores designated $l$, a "no-carry" information from the previous stage is applied to the location $U_0'$. High pressure fluid is applied at the holes designated $h$, the medium pressure fluid is introduced at the points $m$ and the binary numbers $V_0$ and $W_0$ are fed in at the holes designated $V_0$ and $W_0$. Thus the output $U_1'$ supplies the "no-carry" signal in dependency of input information $U_0'$, $V_0$ and $W_0$. It should be noted in this connection that the carry $U_1$ produced in the element of FIG. 5 is fed through the bores $U_1$ in FIG. 6. There being no need for the "carry" $U_1$ in the element 40 of FIG. 6, the bores just serve to convey the signal $U_1$ to the adjacent element shown in FIG. 7.

In FIG. 7 there is shown the arrangement to form the "sum" signal, resulting if a "carry" $U_1$ and the binary numbers $V_1$ and $W_1$ are supplied. In order to match the vertical holes of FIG. 6 with the ones of FIG. 7, in FIG. 7 the input side of the arrangement is on the right and the output of the arrangement is on the left hand side. This arrangement serves to add the binary numbers $V_1$ and $W_1$ under consideration of the "carry" $U_1$ and "no-carry" $U_1'$, resulting from the addition of $V_0$ and $W_0$ in the previous stages and produced by the elements of FIG. 5 and FIG. 6. As an inspection of FIG. 2 reveals, the "carry" signal $U_1$ has to be applied to the outer input lines designated U in FIG. 2 and $U_1$ in FIG. 7. The "no-carry" signal is applied to the center input line designated U' in FIG. 2 and $U_1'$ in the FIG. 7. The binary numbers are applied to the holes $V_1$ and $W_1$ connecting to the first and second cylinders 1 and 2, respectively, the other ends of these cylinders 1 and 2 having supplied thereto the medium pressure fluid $m$. For the reason that in this element 50 the values $V_1$ and $W_1$ are entered for the first time, the bores $V_1$ and $W_1$ penetrate from the top only to the depth of the first and second cylinder 1 and 2, respectively, as this is indicated by the shading. The resulting "sum" signal is appearing in the pipe $S_1$ forming the output. As can be seen, the "carry" information $U_1$, which was produced in the "carry" arrangement of FIG. 5 is communicated through the holes $U_1$ of the arrangement of FIG. 6 and through the holes $U_1$ of the arrangement of FIG. 7. Similarly, the "no-carry" signal produced in the arrangement of FIG. 6 and appearing there at bore $U_1'$ communicates through the hole $U_1'$ of FIG. 7 through channel 53 to the first cylinder 1.

In FIG. 8 there is again shown an arrangement to produce a "carry" signal. The arrangement is best understood by comparison with FIG. 3 and FIG. 4. The input side of FIG. 8 is the right hand side and the output side is the left hand side, so that FIG. 5 and FIG. 8 distinguish from each other in that the input side and output side are interchanged. According to FIG. 3 a "carry" signal U is supplied through the center input line 62. In FIG. 8 the "carry" is designated by reference symbol $U_1$. The signal $U_1$ was produced in the element of FIG. 5, fed through two parallel channels designated $U_1$ through the elements of FIGS. 6 and 7 and to the element of FIG. 8. These channels may penetrate completely through the element of FIG. 8. They find, however, no counterpart or extension any more in FIG. 9. They may, on the other hand, be arranged such that the channels terminate before reaching the top surface of the prism of FIG. 8, yet penetrate so deeply from the bottom that a connection with input line 62 and thus with the first cylinder 1 is established. High pressure fluid is provided in the holes $h$ and low pressure fluid in the holes $l$, the bores 61 and 63 being in a communicating relation with the first cylinder 1. The two control lines communicating medium pressure are again designated by $m$ and the signals representing the binary numbers $V_1$ and $W_1$ are supplied to the holes $V_1$ and $W_1$, which are in registry with the holes of FIG. 7 carrying the same designation. The "carry" signal produced by this arrangement is a function of the applied input values $U_1$, $V_1$ and $W_1$ and appears in the two-sectional output $U_2$. There is also provided a passage $U_1'$ for the "no-carry" signal produced in the arrangement of FIG. 6, and which is communicated through the hole $U_1'$ in FIG. 7, through the horizontal tube 53 connected therewith and through the vertical opening $U_1'$ shown in FIG. 8, from which it leads to the opening $U_1'$ of the block of FIG. 9. For the reason that the signal $U_1'$ is not utilized in the element of FIG. 8, the passage $U_1'$ as shown therein has no communicating connection with any operative part of the element of FIG. 8.

The FIG. 9 shows a "no-carry" arrangement, which is identical with the element shown in FIG. 6, with the exception that, in order to obtain a simple registry of communicating conductors, the right and left hand sides are interchanged. The arrangement is believed to be self-explanatory by comparison with the corresponding circuit of FIG. 4 and in view of the explanations given in connection with FIGS. 5–8. According to this FIG. 9 there is produced the "no-carry" signal $U_2'$ from the input information $V_1$, $W_1$ and $U_1'$, which signal appears at the output designated $U_2'$. The channel system feeding the "no-carry" signal $U_1'$ does not continue into the element or block of FIG. 10.

According to FIG. 10 the "sum" signal is formed which results when the binary numbers $V_2$, $W_2$, a "carry" $U_2$ and a "no-carry" $U_2'$ are applied. In FIG. 10 the input side is the left hand side and the output side is the right hand side. The binary numbers $V_2$ and $W_2$ are again applied through the holes designated $V_2$ and $W_2$' the "carry" signal $U_2$ originating from the operation of the element of FIG. 8 is supplied from the output $U_2$ of FIG. 8 through the holes $U_2$ in FIG. 9 into the holes $U_2$ in FIG. 10 and therefrom through the tubes 1 and 43 into the first cylinder 1. The "no-carry" signal $U_2'$, produced by the operation of the element shown in FIG. 9 and appearing in the output $U_2'$ thereof is communicated through the bore $U_2'$ of FIG. 10 and therefrom through channel 42 to the first cylinder 1. The output signal produced by the arrangement appears in the output conductor $S_2$. Medium pressures is applied at the locations $m$.

The blocks as shown in FIGS. 5–10 may be glued together when stacked one upon the other, or they may be combined in any other suitable manner, whereby care has to be taken that no fluid may leak between the individual layers or blocks from one opening into the other.

The above described functions "carry", "no-carry" and "sum" are not the only applications which are possible with the element according to the invention. In the following there are given some more examples. Referring again back to FIG. 1, the following table represents examples of operations that can be performed, wherein the already described "carry", "no-carry" and "sum" functions are also included for completeness sake.

When connecting input line 11 with high pressure $h$, input line 12 with a "carry" information U, input line 13 with low pressure $l$, control lines 17 and 18 with medium pressure, control line 19 with the information value V and control line 20 with the information value W, there appears in the output line 16 an output signal X, which is the "carry" signal, as determined by the binary informations U, V and W. With these conditions, the element of FIG. 1 operates according to the formula expressed in Boolean algebra, $$X = UV + W(U+V)$$

which is the "carry" condition. This may be represented as follows:

"Carry"

```
11=h    17=m
        18=m
12=U            X=UV+W(U=V)
        19=V
13=l    20=W
```

With the signals applied as defined analogously in the following, the operations may be performed:

"No Carry"

```
11=1    17=m
        18=m
12=U'           X=U'V'+W'(U'+V')
        19=V
13=h    20=W
```

"Sum"

```
11=U    17=m
        18=m
12=U'           X=U(VW+V'W')+U'(V'W+VW')
        19=V
13=U    20=W
```

"No Sum"

```
11=U'   17=m
        18=m
12=U            X=U(V'W+VW')+U'(VW+V'W')
        19=V
13=U'   20=W
```

Applicant's apparatus is a universal logical element. If one thinks of it as a "black box" with six (or seven) pluggable fluid connections thereto, then, depending on the socket into which the "black box" is plugged, the function performed by the "black box" follows. The physical construction of the mechanical elements within the box remains unchanged. Only the pressures of the various fluid connections are changed by the plugging. One would thus be able to manufacture a fluid calculating machine by simply plugging a plurality of identical "black boxes" into different sockets, and thus perform the logic necessary. If, for example, it is assumed that the pipes 11, 12 and 13, by their fluid pressure status adjust the function of the "black box," and the pipes 19 and 20 represent A and B augend and addend inputs, then with binary inputs on the three function control pipes $2^3$ or 8 functions ought to result. With these 8 functions, and binary inputs at A and B to give $2^2$ or 4 combinations of A and B inputs, there are 32 possible combinations of inputs. However, there is only one output pipe (16), which can have only one of two pressure statuses indicative of a binary output. Therefore, it is obvious that certain of the 32 input combinations must produce the same output. In fact, 16 combinations produce a "0" output, and 16 a "1" output.

The total combinations of the pressure inputs on pipes 11, 12, and 13 as well as the combinations of A and B inputs can best be seen in tabular form wherein "0" represents low pressure and "1" represents high pressure as follows:

| I.—AND | | | | | | IV.—NOT AND | | | | | |
|---|---|---|---|---|---|---|---|---|---|---|---|
| 11 | 12 | 13 | (A) 19 | (B) 20 | (X) 16 | 11 | 12 | 13 | (A) 19 | (B) 20 | (X) 16 |
| 1 | 0 | 0 | 0 | 0 | 0 | 0 | 0 | 1 | 0 | 0 | 1 |
| 1 | 0 | 0 | 1 | 0 | 0 | 0 | 0 | 1 | 1 | 0 | 0 |
| 1 | 0 | 0 | 0 | 1 | 0 | 0 | 0 | 1 | 0 | 1 | 0 |
| 1 | 0 | 0 | 1 | 1 | 1 | 0 | 0 | 1 | 1 | 1 | 0 |

| II.—EXCLUSIVE OR | | | | | | V.—EQUAL | | | | | |
|---|---|---|---|---|---|---|---|---|---|---|---|
| 11 | 12 | 13 | (A) 19 | (B) 20 | (X) 16 | 11 | 12 | 13 | (A) 19 | (B) 20 | (X) 16 |
| 0 | 1 | 0 | 0 | 0 | 0 | 1 | 0 | 1 | 0 | 0 | 1 |
| 0 | 1 | 0 | 1 | 0 | 1 | 1 | 0 | 1 | 1 | 0 | 0 |
| 0 | 1 | 0 | 0 | 1 | 1 | 1 | 0 | 1 | 0 | 1 | 0 |
| 0 | 1 | 0 | 1 | 1 | 0 | 1 | 0 | 1 | 1 | 1 | 1 |

| III.—OR | | | | | | VI.—NOT OR | | | | | |
|---|---|---|---|---|---|---|---|---|---|---|---|
| 11 | 12 | 13 | (A) 19 | (B) 20 | (X) 16 | 11 | 12 | 13 | (A) 19 | (B) 20 | (X) 16 |
| 1 | 1 | 0 | 0 | 0 | 0 | 0 | 1 | 1 | 0 | 0 | 1 |
| 1 | 1 | 0 | 1 | 0 | 1 | 0 | 1 | 1 | 1 | 0 | 1 |
| 1 | 1 | 0 | 0 | 1 | 1 | 0 | 1 | 1 | 0 | 1 | 1 |
| 1 | 1 | 0 | 1 | 1 | 1 | 0 | 1 | 1 | 1 | 1 | 0 |

| VII.—ILLOGICAL | | | | | | VIII.—ILLOGICAL | | | | | |
|---|---|---|---|---|---|---|---|---|---|---|---|
| 11 | 12 | 13 | (A) 19 | (B) 20 | (X) 16 | 11 | 12 | 13 | (A) 19 | (B) 20 | (X) 16 |
| 0 | 0 | 0 | 0 | 0 | 0 | 1 | 1 | 1 | 0 | 0 | 1 |
| 0 | 0 | 0 | 1 | 0 | 0 | 1 | 1 | 1 | 1 | 0 | 1 |
| 0 | 0 | 0 | 0 | 1 | 0 | 1 | 1 | 1 | 0 | 1 | 1 |
| 0 | 0 | 0 | 1 | 1 | 0 | 1 | 1 | 1 | 1 | 1 | 1 |

It is to be noted that Tables I through VI represent logical combinations of A and B that are employed in calculating machines. Tables VII and VIII represent illogical combinations of inputs and are not employed, as the output is constant and independent of the inputs.

Applicant's "black box" is thus capable of any one of at least six different logical functions simply by plugging into a respective socket I through VI, corresponding to the tables above. In addition, if one of the sockets should have controllable pressures on the pipes 11, 12 and 13 the "black box" can provide an output manifestive of the binary "sum only" or binary "carry out" of the sum of two digits A and B, and a "carry in." The "sum only" output is achieved by switching between the operation of Table II (no carry in) and Table V (carry in). The "carry out" operation is achieved by switching between the operation of Table I (no carry in) and Table III (carry in). With two "black boxes," each in its socket, one could thus perform a binary full addition, adding A and B and a "carry in" and producing a sum and carry out in accordance with the laws of binary addition.

While the invention has been particularly shown and described with reference to preferred embodiments thereof, it will be understood by those skilled in the art that various changes in form and details may be made therein without departing from the spirit and scope of the invention.

What is claimed is:

1. A fluid operated universal logical device capable of adjustably performing a plurality of different logical functions, and adjusted to perform as a logical half adder to produce an output manifestive of carry only in the binary addition of three binary digit inputs in accordance with the laws of binary addition comprising:

(a) a first fluid input duct having fluid therein at the higher of two predetermined pressure levels;

(b) a second fluid input duct having fluid therein at a selected one of said two pressure levels to manifest the binary digital value of a first digit to be added, wherein high pressure manifests a binary "1" and low pressure binary "0";

(c) a third fluid input duct having fluid therein at the lower of the two predetermined pressure levels;

(d) a first two-position valve having first and second fluid outlet ducts, and first, second, and third fluid inlet ports, respectively connected to said first, second and third fluid input ducts, and operative in a first of said two positions to connect said first fluid-outlet duct to said second fluid inlet port, and said second fluid outlet duct to said third fluid inlet port, and in a second of said two positions to connect said first fluid outlet duct to said first fluid inlet port, and said second fluid outlet duct to said second fluid inlet port, the said first position of said valve manifesting a binary "0" digital input and the said second position manifesting a binary "1" digital input;

(e) a second two-position valve having a single fluid output duct, and first and second fluid inlet ports respectively connected to the said first and second fluid outlet ducts of said first valve, and operative in a first of said two positions to connect said output duct to said second inlet port, and in a second of said two positions to connect said outlet duct to said first inlet port, the said first position of said valve manifesting a binary "0" and the second position manifesting a binary "1" digital input;

(f) and fluid operated means for selectively establishing said first and said second valves in one of their two positions to manifest the respective binary data inputs;

whereby said output duct will be connected to high pressure fluid in said input ducts to manifest a binary "1," or to low pressure fluid in said fluid input ducts to manifest a binary "0" carry only as a function of the three digits to be added.

2. A fluid operated universal logical device capable of adjustably performing a plurality of different logical functions, and adjusted to perform as a logical AND device to produce an output response only upon the simultaneous occurrence of two inputs comprising:

(a) a first fluid input duct having fluid therein at the higher of two predetermined pressure levels;

(b) a second fluid input duct having fluid therein at the lower of the two predetermined pressure levels;

(c) a third fluid input duct having fluid therein at the lower of the two predetermined pressure levels;

(d) a first two-position valve having first and second fluid outlet ducts, and first, second, and third fluid inlet ports, respectively connected to said first, second and third fluid input ducts, and operative in a first of said two positions to connect said first fluid-outlet duct to said second fluid inlet port, and said second fluid outlet duct to said third fluid inlet port, and in a second of said two positions to connect said first fluid outlet duct to said first fluid inlet port, and said second fluid outlet duct to said second fluid inlet port, the said first position of said valve manifesting a binary "0" and the said second position manifesting a binary "1" digital input;

(e) a second two-position valve having a single fluid output duct, and first and second fluid inlet ports respectively connected to the said first and second fluid outlet ducts of said first valve, and operative in a first of said two positions to connect said output duct to said second inlet port, and in a second of said two positions to connect said outlet duct to said first inlet port, the said first position of said valve manifesting a binary "0" and the second position manifesting a binary "1" digital input;

(f) and fluid operated means for selectively establishing said first and said second valves in one of their two positions to manifest the respective binary data inputs;

whereby said fluid output duct will be connected with high pressure fluid in said fluid input duct only when said valves are both positioned in the second of their two positions, and the fluid output duct will be connected with low pressure fluid in said fluid input ducts when either or both of said first and second valves occupies the first of said two positions.

3. A fluid operated universal logical device capable of adjustably performing a plurality of different logical functions, and adjusted to perform as a logical OR device comprising:

(a) a first fluid input duct having fluid therein at the higher of two predetermined pressure levels;

(b) a second fluid input duct having fluid therein at the higher of the two predetermined pressure levels;

(c) a third fluid input duct having fluid therein at the lower of the two predetermined pressure levels;

(d) a first two-position valve having first and second fluid outlet ducts, and first, second, and third fluid inlet ports, respectively connected to said first, second and third fluid input ducts, and operative in a first of said two positions to connect said first fluid-outlet duct to said second fluid inlet port, and said second fluid outlet duct to said third fluid inlet port, and in a second of said two positions to connect said first fluid outlet duct to said first fluid inlet port, and said second fluid outlet duct to said second fluid inlet port, the said first position of said valve manifesting a binary "0" and the said second position manifesting a binary "1" digital input;

(e) a second two-position valve having a single fluid output duct, and first and second fluid inlet ports respectively connected to the said first and second fluid outlet ducts of said first valve, and operative in a first of said two positions to connect said output duct to said second inlet port, and in a second of said two positions to connect said outlet duct to said first inlet port, the said first position of said valve manifesting a binary "0" and the second position manifesting a binary "1" digital input;

(f) and fluid operated means for selectively establishing said first and said second valves in one of their two positions to manifest the respective binary data inputs;

whereby said output duct will be connected to high pressure fluid in said fluid input ducts when either of said valves occupies its second position, and to low pressure fluid in said fluid input duct when both said valves occupy said first position.

4. A fluid operated universal logical device capable of adjustably performing a plurality of different logical functions, and adjusted to perform as a logical NOT AND device comprising:

(a) a first fluid input duct having fluid therein at the lower of two predetermined pressure levels;

(b) a second fluid input duct having fluid therein at the lower of the two predetermined pressure levels;

(c) a third fluid input duct having fluid therein at the higher of the two predetermined pressure levels;

(d) a first two-position valve having first and second fluid outlet ducts, and first, second, and third fluid inlet ports, respectively connected to said first, second and third fluid input ducts, and operative in a first of said two positions to connect said first fluid-outlet duct to said second fluid inlet port, and said second fluid outlet duct to said third fluid inlet port, and in a second of said two positions to connect said first fluid outlet duct to said first fluid inlet port, and said second fluid outlet duct to said second fluid inlet port, the said first position of said valve manifesting a binary "0" and the said second position manifesting a binary "1" digital input;

(e) a second two-position valve having a single fluid output duct, and first and second fluid inlet ports respectively connected to the said first and second fluid outlet ducts of said first valve, and operative in a first of said two positions to connect said output duct to said second inlet port, and in a second of said two positions to connect said outlet duct to said first inlet port, the said first position of said valve manifesting a binary "0" and the second position manifesting a binary "1" digital input;

(f) and fluid operated means for selectively establishing said first and said second valves in one of their two positions to manifest the respective binary data inputs;

whereby said output duct will be connected to high pressure fluid in said input duct only when said first and said second valves occupy said first position, and to low pressure fluid in said fluid input ducts when either of said first or second valves occupies said second position.

5. A fluid operated universal logical device capable of adjustably performing a plurality of different logical functions, and adjusted to perform as a logical NOT OR device comprising:

(a) a first fluid input duct having fluid therein at the lower of two predetermined pressure levels;

(b) a second fluid input duct having fluid therein at the higher of the two predetermined pressure levels;

(c) a third fluid input duct having fluid therein at the higher of the two predetermined pressure levels;

(d) a first two-position valve having first and second fluid outlet ducts, and first, second, and third fluid inlet ports, respectively connected to said first, second, and third fluid input ducts, and operative in a first of said two positions to connect said first fluid-outlet duct to said second fluid inlet port, and said second fluid outlet duct to said third fluid inlet port, and in a second of said two positions to connect said first fluid outlet duct to said first fluid inlet port, and said second fluid outlet duct to said second fluid inlet port, the said first position of said valve manifesting a binary "0" and the said second position manifesting a binary "1" digital input;

(e) a second two-position valve having a single fluid output duct, and first and second fluid inlet ports respectively connected to the said first and second fluid outlet ducts of said first valve, and operative in a first of said two positions to connect said output duct to said second inlet port, and in a second of said two positions to connect said outlet duct to said first inlet port, the said first position of said valve manifesting a binary "0" and the second position manifesting a binary "1" digital input;

(f) and fluid operated means for selectively establishing said first and said second valves in one of their two positions to manifest the respective binary data inputs;

whereby said fluid output duct will be connected with high pressure fluid in said fluid input ducts when either or both of said valves is positioned in said first position, and with low pressure fluid in said first fluid input duct when both of said valves are positioned in the second of said two positions.

References Cited in the file of this patent

UNITED STATES PATENTS

| | | |
|---|---|---|
| 2,751,933 | Urteaga | June 26, 1956 |
| 2,904,070 | Lynott | Sept. 15, 1959 |
| 3,057,551 | Etter | Oct. 9, 1962 |